United States Patent Office 3,646,226
Patented Feb. 29, 1972

3,646,226
HYDROXY COMPOUND MANUFACTURE
Richard D. Smetana, Beacon, and Roger G. Duranleau, Poughquag, N.Y., assignors to Texaco Inc., New York, N.Y.
No Drawing. Filed Apr. 23, 1969, Ser. No. 818,841
Int. Cl. C07c 37/00
U.S. Cl. 260—621 G
4 Claims

ABSTRACT OF THE DISCLOSURE

A method of preparing a hydroxy compound of the formula:

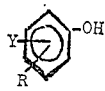

where R is hydrogen or alkyl and Y is hydrogen or —OH comprising first contacting in the substantial absence of water an alpha-olefinic compound of the formula:

where X is

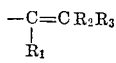

$$-C=CR_2R_3$$
$$\,|\,$$
$$R_1$$

Z is hydrogen or X, $R_1$, $R_2$ and $R_3$ are hydrogen or alkyl, R is as heretofore defined with ozone and alkanoic acid and then contacting the resultant reaction mixture with mineral acid and water.

BACKGROUND OF INVENTION

The subject invention is in the field of art relating to the production of mono- and dihydroxybenzenes as well as their hydrocarbyl substituted counterparts.

In the past, these compounds were prepared by various methods, one of the most common calling for the chlorination of benzene or alkyl substituted benzene to form a mono- or dichlorobenzene counterpart followed by heating the chlorobenzene with dilute sodium and strontium hydroxides under very high pressure in a continuous tubular system of copper. Although this method produced hydroxybenzenes in satisfactory quantities, it required high pressure equipment and special handling of the highly toxic chlorine resulting in increased costs. There was, therefore, a need for a simplified procedure to produce hydroxy compound which does not require the use of high pressure or chlorine.

SUMMARY OF INVENTION

We have discovered, and this constitutes our invention, a method of producing hydroxy compound from basic hydrocarbons without the employment of high pressure equipment and extremely toxic materials. More specifically, our method comprises contacting under substantially anhydrous conditions an alpha-olefinic compound of the formula:

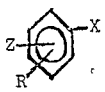

where X is

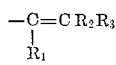

$$-C=CR_2R_3$$
$$\,|\,$$
$$R_1$$

Z is hydrogen or X, where R, $R_1$, $R_2$ and $R_3$ are hydrogen or alkyl of from 1 to 10 carbons with ozone in the presence of an alkanoic acid of from 2 to 10 carbons and contacting the resulting acyloxyhydroperoxide intermediate with mineral acid and water and recovering the resultant hydroxy compound therefrom characterized by the formula:

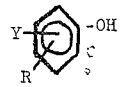

where R is as heretofore defined and Y is hydrogen or —OH.

Hereinbefore and hereinafter by the term "substantially anhydrous" a water content less than about 1 wt. percent based on the reaction mixture is intended.

DETAILED DESCRIPTION OF THE INVENTION

Specifically, the method of the invention comprises first reacting under substantially anhydrous conditions, a mixture of alpha-olefinic compound, ozone and alkanoic acid, all as heretofore defined at a temperature between about —100 and 100° C., preferably between —25 and 25° C., utilizing a mole ratio of alpha-olefinic compound to ozone of between about 1:1 and 20:1, preferably about 1:1, and a mole ratio of olefin to alkanoic acid of between about 1:1 and 1:100. The reaction period is normally between 1 and 3 hours although longer and shorter periods may be utilized, the exact time being dependent upon the yield desired under the conditions used.

As a second step the resultant reaction mixture is contacted with mineral acid utilizing a mole ratio of olefin to acid reactant of between about 1:10 and 10:1, preferably between 1:1 and 5:1 at a temperature between about —25 and 100° C., preferably between 25 and 50° C., and adding water in sufficient quantity to give a final mixture content advantageously of between about 50 and 90 wt. percent water, desirably about 75 wt. percent, at a temperature between about 0 and 100° C., preferably between 0 and 50° C. The resultant hydroxyl compounds are recovered from the hydrolysis mixture and purified by standard means such as fractional distillation, filtration, recrystallization, washing and combinations thereof.

Advantageously, the ozonation stage is conducted in the presence of a solvent normally constituting between about 20 and 80 wt. percent of the reaction mixture. Suitable solvents are the liquid alkanes, halogenated alkanes and the alkanoic acid anhydrides. Examples of the above solvents are chloroform, carbon tetrachloride, pentane, hexane, acetic anhydride and propanoic anhydride. The employment of the alkanoic anhydride as solvent diluent is preferred since it aids in that it not only faciliates ingredient contact but aids in the maintenance of substantially anhydrous conditions.

Under preferred conditions, in the second step the mineral acid contact is done under substantially anhydrous conditions and in the presence of between about 20 and 80 wt. percent (based on the reaction mixture) of alkanoic acid anhydride. The mineral acid is added as a between 5 and 50 wt. percent solution in an alkanoic acid anhydride.

Under less preferred conditions, the mineral acid and water contact can be simultaneous rather than sequential, however, the yield of hydroxy compound is sharply reduced.

During ozonation and acid-water contact the reaction mixture is preferably stirred in order to facilitate contact of the ingredients therein.

The following equations further illustrate the method of the invention utilizing alpha-methylstyrene, acetic acid, acetic anhydride, sulfuric acid, water and ozone as reaction ingredients.

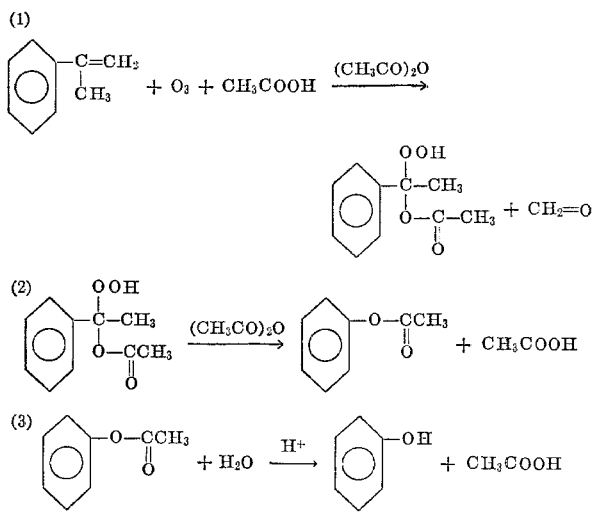

Particular examples of the alpha-olefinic compounds contemplated herein are alpha-methylstyrene, 1-(m-tolyl)-1-pentene, 4-(p-propylphenyl)-3-heptene, 1,4-diisopropenylbenzene, and 2,5-diisopropenyltoluene. Examples of the corresponding phenols produced from the aforementioned olefins are phenol, m-cresol, propylphenol, 1,4-dihydroxybenzene and 2,5-dihydroxytoluene.

The ozone employed is normally in admixture with air, oxygen or an inert gas such as nitrogen in a quantity of between about 0.1 and 15 mole percent.

Examples of the alkanoic acids which can be utilized are acetic, propanoic, butanoic and hexanoic acids with acetic acid being preferred. Also in regard to the alkanoic anhydride the anhydride of the foregoing acids are contemplated with acetic anhydride being the most preferred.

In respect to the acidification any of the mineral acids are suitable such as sulfuric acid, perchloric acid, hydrochloric acid and phosphoric acid.

The following examples further illustrate the method of the invention but are not to be construed as limitations thereof.

EXAMPLE I

To a 3-neck, 200 ml. round bottom flask fitted with a thermometer, Dry Ice condenser, gas sparger and magnetic stirring bar, there are charged 11.8 grams (0.10 mole) of alpha-methylstyrene, 20 grams (0.33 mole) acetic acid and 80 grams of acetic anhydride. The temperature of the resultant stirred mixture is lowered to and maintained at −25° C. and a stream of 4.0 mole percent ozone and oxygen is passed through the solution for 105 minutes at a rate of 600 ml./minute. Upon completion of the ozone contact there is slowly introduced with stirring 100 grams of an acetic anhydride solution containing 8 wt. percent concentrated sulfuric and the resultant mixture is heated to and maintained at 80° C. for 100 minutes. An aliquot of the reaction mixture is set aside and found to contain phenyl acetate in a yield of 32 wt. percent basis olefin charge. To the remainder (210 grams) of said mixture there is charged with stirring 200 grams of water and the formed aqueous mixture is maintained at a temperature of 30° C. for 60 minutes whereupon the aqueous mixture is subjected to fractional distillation and phenol is recovered in a yield of 30 wt. percent basis alpha-methylstyrene.

EXAMPLE II

The foregoing procedure is repeated with the exception the acetic anhydride solution contains 36 wt. percent concentrated sulfuric acid. The yield of intermediate phenyl acetate and phenol is 46 wt. percent.

EXAMPLE III

To a 3 neck, 100 ml. round bottom flask there is fitted a thermometer, Dry Ice condenser and gas sparger and a magnetic stirring bar. To the flask there are charged 6.0 grams (0.04 mole) of p-diisopropenylbenzene, 10 grams (0.17 mole) of acetic acid and 40 grams of acetic anhydride. The stirrer is actuated and the temperature of the mixture is reduced to and maintained at −25° C. to 0° C. while 4.0 mole percent ozone in oxygen is passed through the solution for 85 minutes at a rate of 600 ml./minute. At the end of the ozonation period the reaction product is contacted with 50 grams of acetic anhydride solution containing 36 wt. percent concentrated sulfuric acid under stirring conditions for one hour. An aliquot of the acidified mixture is recovered and is found to contain 6 wt. percent p-diacetoxybenzene. The remainder of the solution (105 grams) is diluted with 100 grams of water and stirred for one hour. At the end of said one hour period the mixture is subjected to fractional distillation and 1,4-dihydroxybenzene is recovered in a yield of 5 wt. percent basis the olefin reactant.

We claim:
1. A method of preparing a hydroxy compound of the formula:

where R is hydrogen or alkyl of from 1 to 10 carbons and Y is hydrogen or hydroxyl comprising:
(a) first contacting an alpha-olefin of the formula:

where X is

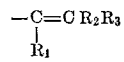

Z is hydrogen or X, where R is as defined, $R_1$, $R_2$ and $R_3$ are hydrogen or alkyl of from 1 to 10 carbons, with ozone in the presence of an alkanoic acid of from 2 to 10 carbons at a temperature between about −100 and 100° C. utilizing a mole ratio of olefin to ozone of between about 1:1 and 20:1 olefin to alkanoic acid between about 1:1 and 1:100;
(b) then second sequentially contacting the resultant mixture with mineral acid and water at a temperature between about 0 and 100° C. utilizing an olefin to mineral acid mole ratio between about 1:10 and 10.1 and water content of between about 50 and 90 wt. percent of said resultant mixture and recovering said hydroxy compound therefrom.
2. A method in accordance with claim 1 wherein said mineral acid is introduced as a between 5 and 50 wt.

percent solution in an alkanoic acid anhydride and under substantially anhydrous conditions.

3. A method in accordance with claim 2 wherein said hydroxy compound is phenol, said alpha-olefinic compound is alpha-methylstyrene, said alkanoic acid is acetic acid, said mineral acid is sulfuric acid, and said alkanoic acid anhydride is acetic anhydride.

4. A method in accordance with claim 2 wherein said hydroxy compound is 1,4-dihydroxybenzene, said alpha-olefinic compound is 1,4-diisopropenylbenzene, said alkanoic acid is acetic acid, said mineral acid is sulfuric acid and said alkanoic acid anhydride is acetic anhydride.

References Cited

Briner et al.: "Chem. Abstracts," vol. 59, p. 4677d (1963).

Kawamura: "Chem. Abstracts," vol. 41, p. 4463b (1942).

Fliszar: "Chem. Abstracts," vol. 65, pp. 16824–5 (1966).

LEON ZITVER, Primary Examiner

N. MORGENSTERN, Assistant Examiner

U.S. Cl. X.R.

260—497 R, 479 R